UNITED STATES PATENT OFFICE.

WILLIAM VALENTINE FRY, OF LAMBAYEQUE, PERU.

PROCESS OF PURIFYING CANE-JUICE.

SPECIFICATION forming part of Letters Patent No. 472,989, dated April 19, 1892.

Application filed June 16, 1891. Serial No. 396,486. (No specimens.)

*To all whom it may concern:*

Be it known that I, WILLIAM VALENTINE FRY, a subject of the Queen of Great Britain, residing at Lambayeque, Republic of Peru, have invented certain new and useful Improvements in Process of Purifying Cane-Juice; and I do hereby declare the following to be a full, clear, and exact description of the invention, such as will enable others skilled in the art to which it appertains to make and use the same.

Heretofore in the purification or defecation of cane-juice several processes and substances have been used, among which may be mentioned as most important what are known as the "quick-lime" process and the so-called "sulphur" process. Various other chemical agents have been used, all of which, however, fail to give satisfactory results. The most serious objection to the use of quick-lime is that it has a tendency to burn the juice, thereby making crystallization more difficult, and, as the crystals are made darker, requiring more washing if whitened by the centrifugal process and a considerable loss in product if purified by the claying process. Where the sulphur process is used, the result is a beautiful clear crystal for the first sugar; but the seconds and thirds are very inferior, and what is known as the "distillery-wash" is practically useless in the manufacture of alcohol.

My invention has for its object, by a simple and inexpensive process, first, to avoid darkening the crystals, thereby effecting a great saving in the product in what are termed the "first sugars;" second, to produce far superior second and third sugars, and, third, to produce a residium or distillery-wash which shall not be in any way impaired for use in the manufacture of alcohol.

To carry my invention into effect, I place a quantity—say for example, thirty pounds—of the leaves, twigs, or points of small boughs of the eucalyptus tree in a kettle or boiler with a proportionate quantity of cold water, the quantity of water for thirty pounds of leaves, twigs, &c., being fifty-five gallons, more or less. The contents of the kettle are then boiled for three hours, more or less, or until the decoction has a density of 15° Cartier standard when the liquid is hot. When cold, the density of the decoction will be from 9° to 10° Cartier standard. The decoction will lose from eight to ten gallons during the process of boiling, the evaporation of course depending to a certain extent on the intensity of the fire. The decoction is then properly strained to separate it from the leaves, twigs, &c., and is ready for use in the process of purification.

I use the decoction in the proportion of from one and one-half to two gallons of the decoction to five hundred gallons of cane-juice.

The manner of using is ordinarily as follows: I place in the defecator from twenty to forty gallons of cane-juice, to which I add the eucalyptus decoction in about the proportion specified, taking care that the contents of the defecator be well stirred. Heat is then applied in the usual or any preferred manner until an active ebullition takes place. Before the ebullition takes place the impurities will have risen to the top of the liquid in the defecator. As soon as the ebullition takes place the steam or heat is cut off from the defecator and a short time—say from ten to twelve minutes—is allowed for settling. The juice can then be passed to the evaporator or vacuum-pans for the making of the sugar and the impurities can then be removed in the usual manner employed in cooking-houses. If white sugar is required, charcoal filters should be used. To make the ordinary grained sugar of commerce, no charcoal filters are required, but bag-filters can be used to advantage.

In this specification where the term "gallon" is used I refer to the ordinary liquid gallon of two hundred and thirty-one cubic inches.

Litmus-paper can of course be used at all times to test acidity; but I find in practice that the person having the operation in charge quickly learns from experience the quantity of the eucalyptus decoction that is required to be put into the defecator without the use of litmus-paper.

Having thus described my invention, I claim—

The process of purifying cane-juice, which consists in mixing with the cane-juice a decoction of eucalyptus of substantially the strength and in the proportions specified and then applying heat to the liquid until ebullition takes place.

In testimony whereof I affix my signature in presence of two witnesses.

WILLIAM VALENTINE FRY.

Witnesses:
A. ZUAZO,
C. A. OJEDA.